W. A. TURBAYNE.
ELECTRIC REGULATOR.
APPLICATION FILED MAY 3, 1911.

1,357,933.

Patented Nov. 2, 1920.

Witnesses:

Inventor:
William A. Turbayne

UNITED STATES PATENT OFFICE.

WILLIAM A. TURBAYNE, OF BUFFALO, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

ELECTRIC REGULATOR.

1,357,933.      Specification of Letters Patent.      Patented Nov. 2, 1920.

Application filed May 3, 1911. Serial No. 624,769.

*To all whom it may concern:*

Be it known that I, WILLIAM A. TURBAYNE, a citizen of the United States, residing at Buffalo, in the county of Erie and State of New York, have invented new and useful Improvements in Electric Regulators, of which the following is a full, clear, concise, and exact description, reference being had to the accompanying drawing, forming a part of this specification.

My invention relates to electric regulators.

In this application I shall, for purposes of illustration, describe two forms of the invention adapted to use as a regulator for regulating a generator supplying charging current to a storage battery. My invention, however, is in nowise limited in its application to these forms or to this use, but may assume various different forms and be used in various other relations.

In the charging of a storage battery, there may occur a pronounced rise in the voltage across the battery terminals when the battery is at or near a state of full charge. In systems in which it is desired to charge the battery at a constant current, this rise in voltage is sometimes utilized to determine when such charging current shall be reduced, to prevent bubbling and gassing of the electrolyte. In order to avoid the tendency of a generator equipped with an automatic current regulator, to increase the voltage impressed on the battery in its effort to maintain a certain definite current supply through the battery, despite the change in the condition of the battery, electric regulators have been devised in which a resistance arranged in series with the field of the generator is controlled by a current coil and the action of this coil is in turn regulated by a voltage responsive coil. This voltage responsive coil, upon a predetermined rise in the voltage of the generator, acts to cut down the output of the generator and thus prevent damage to the battery. Such regulators are known in the art as taper charge regulators or stop charge regulators, depending upon whether they gradually cut down the output of the generator as the battery becomes charged or whether the output of the same is immediately cut down.

An object of my invention is to provide an electrical regulator for performing either the stop or taper charge functions, and having improved mechanical connections between the shunt and series coils and the regulating resistance. Further objects and advantages of my improved construction will hereinafter appear.

In the accompanying drawings I have shown two forms which my invention may assume when applied to a system for charging storage batteries.

In the drawings:—

Figure 1:
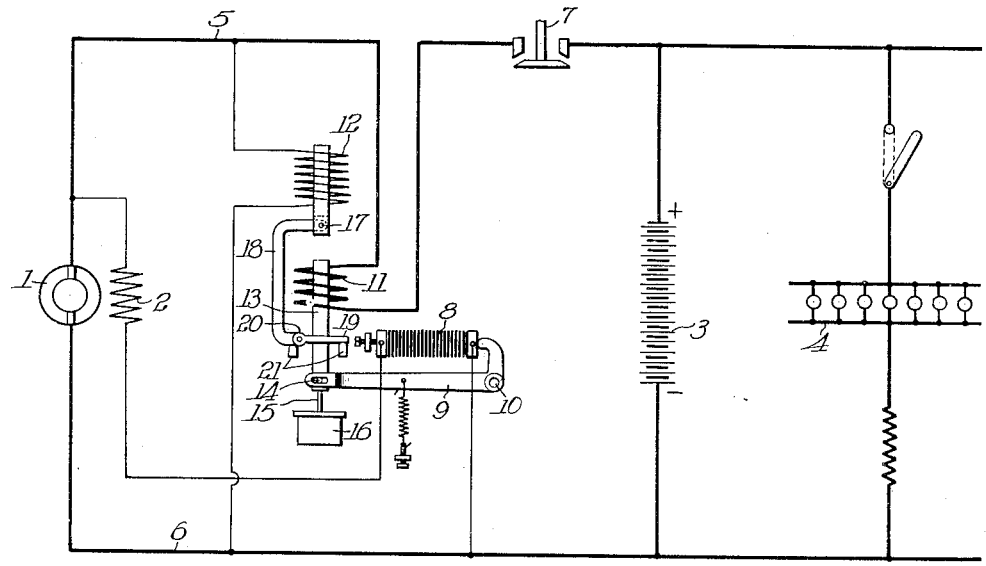
Figure 1 shows a diagrammatic view of the system.

In these drawings I have shown a variable speed generator having an armature 1 and a shunt field winding 2. The generator supplies current to a storage battery 3 and lamps 4 connected across the mains 5 and 6. As is usual in such systems, I have provided an automatic switch 7 which may be of the usual construction and is connected in the main 5. A resistance 8, preferably of the compressible carbon disk type, is arranged in series with the shunt field 2 of the generator. This resistance is adapted to be varied in a well known manner by a bell crank lever 9 suitably pivoted at 10. The movement of the lever is controlled both by a current responsive device here shown, for example, to consist of a coil 11 of a few turns of coarse wire in the form of a solenoid in series in the main circuit, and by a voltage responsive device here shown, for example, to consist of a coil 12 of a large number of turns of fine wire in the form of a solenoid in shunt across the leads 5 and 6. The core 13 of the series coil 11 is pivoted at 14 to the free end of the bell crank lever 9 and is provided with an extension 15 which passes down into a suitable dashpot 16. The core 17 of the shunt coil 12 is provided with an extension 18 which is preferably substantially U-shaped and extends down below the series coil 11. At its lower end this extension 18 is provided with a suitable clutch 19, preferably of the ring type, as shown, pivoted to the same at 20, which normally loosely surrounds the lower end of the core 13. This clutch, with the lower end of the extension 18, normally rests on suitable stops 21.

Let us first consider the action of the regulator while the battery is being charged. While the battery is being charged, the counter-electro-motive force of the same will rise slightly and the generator will be regulated by the series coil 11 and the resistance 8 in series with the field of the generator. When the current flowing to the battery tends to increase above a predetermined amount, due to a high speed of armature rotation the coil 11 will draw in its core 13 and turn the bell crank lever 9 about its pivot to release somewhat the pressure on the carbon blocks or disks of the resistance 8, and thus increase their resistance and consequently the resistance in the shunt field 2 of the generator to cut down the current output. Thus it is seen that as the current supplied to the battery tends to vary either above or below a predetermined amount, the resistance in series with the shunt field of the generator will be increased or decreased in order to tend to maintain the current delivered by the generator constant. When the battery is charged, it is desirable to cut down the charging current and for determining the proper time, the pronounced rise in voltage, above referred to, may be utilized, where refinements of accuracy are not required. The shunt coil 12, being connected across the line, is responsive to the voltage of the generator, and this coil, on an increase of generator voltage above a certain predetermined amount, will act to draw in its core 17, and through the engagement of its clutch 19 with the core 13 of the series coil 11, will assist the coil 11 in lifting its core 13 to rock the bell crank lever 9 farther about its pivot 10 to insert a greater amount of resistance in series with the shunt field of the generator and thus cut down the output of the generator to the desired amount. If desired, the coil 12 and its core may be of such a construction or design that the core will be drawn up rapidly upon the attainment of a certain voltage, in which case a large amount of resistance would be quickly thrown in series with the shunt field of the generator and the output of the same would be immediately cut down so that the regulator would act as a stop charge device. Or the coil and the core moving within the same may be of such a construction or design that the core is adapted to float more or less in its upward movement so that it will move upward gradually and the action of the shunt coil will therefore result in gradually introducing more resistance in series with the shunt field of the generator so that the regulator will thus act as a taper charge device.

It is, of course, to be understood that I am here describing only one form of my invention, and that many and various adaptations of the same are possible. For instance, in referring to the coils 11 and 12 as series and shunt coils, I have illustrated them as solenoids. In practice they may assume either the form of solenoids or of other electro-responsive devices. Further, they may in practice be connected either electrically or mechanically in various different arrangements, and the resistance which they may control may likewise be of a different form or operate in a different manner. Further, the clutch may be of any other suitable type than the ring type here shown.

Figure 2:
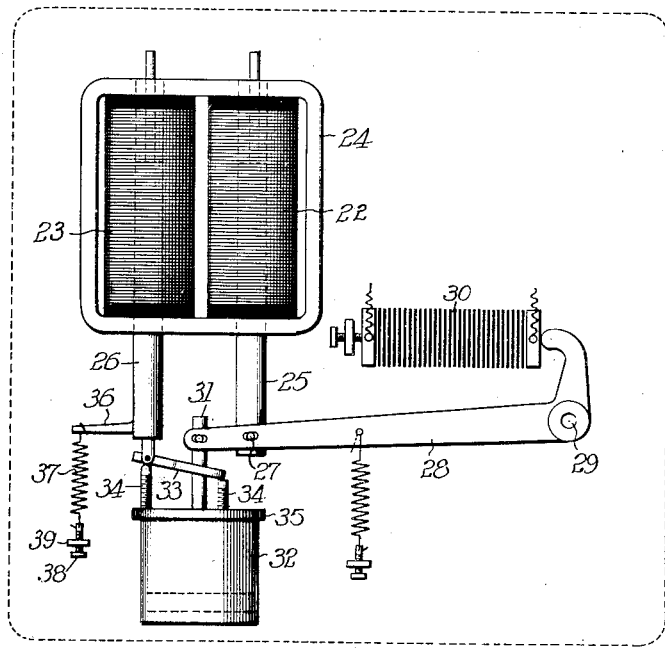
Fig. 2 shows a detail view of a modified form of the regulator.

In Fig. 2 I have, for instance, illustrated a modified form of part of the regulator shown in Fig. 1. As illustrated in this figure, the series coil consists preferably of a few turns of coarse wire, as described in connection with Fig. 1, and as shown at 22, while the shunt coil consists of a large number of turns of fine wire, as shown at 23, and arranged next the coil 22 in a suitable iron frame 24. The series coil 22 is provided with a reciprocating core 25 as is the shunt coil 23, as shown at 26. The core 25 is pivoted at 27 to the bell crank lever 28 which is in turn pivoted at 29 and adapted to bear against a pile of carbon disks 30 to vary the pressure on the same in the same manner as described in connection with Fig. 1. The long arm of the bell crank lever 28 is pivoted at its end to the piston-rod 31 of a dash-pot 32. The core 26 of the shunt coil 23 is provided at its lower end with a suitable clutch 33, which may be of the ring type, if desired. The clutch 33 is adapted to engage the piston-rod 31 of the dash-pot 32 when the shunt coil is energized on a predetermined increase in voltage, just as in the case of the construction described in connection with Fig. 1. In order to provide suitable unlocking and supporting stops for the clutch 33 and the end of the core 26, I have provided studs 34 mounted on opposite sides of the top 35 of the dash-pot 32 in the position shown in Fig. 2. Further, in order to provide some means for insuring a quick return of the core 26 to its down position on a fall in voltage, I have provided this core with a lateral extension 36 to the end of which is fixed a suitable spring 37, the opposite end of which spring is fixed to a nut 38 adjustable with respect to its support 39. The action of the device shown in Fig. 2 is substantially the same as that of the device shown in Fig. 1, although in this instance the stops 34 are mounted upon the top of the dash-pot and the core 26 is provided with resilient means tending to throw it to its down position.

By my improved construction I have provided a regulator which is very positive in its action and capable of responding rapidly to slight changes in the condition of the generator. Further, my improved regulator is of such simple construction that it may be cheaply manufactured and the construction is such that it is not liable to get out of order readily and is well adapted to withstand the long usage to which such regulators are subjected, and operate successfully through long periods with a minimum of attention.

In the foregoing application I have described two specific forms of my improved regulator as applied to use in connection with a system for charging storage batteries, but as I have stated in the beginning of this specification, I have chosen these forms and this use of my improved regulator only as means of illustrating the principle of my invention, since my invention itself is neither limited to these particular forms or to this particular use and may be used wherever it is desired to regulate the output of a generator, or in various other relations.

What I claim as new and desire to secure by Letters Patent of the United States is:—

1. An electric regulator having a regulating resistance, a current responsive coil, operating means controlled thereby, a voltage responsive coil, operating means controlled thereby, one of said operating means being provided with engaging means for engaging said other operating means, whereby at certain stages of operation said other operating means may operate independently of said first operating means and whereby said first operating means may instantly control said other operating means.

2. An electric regulator having a current responsive coil, operating means controlled thereby, a voltage responsive coil, operating means controlled thereby, and a variable pressure resistance, engaging means connecting said operating means, whereby operation of either of said operating means causes an immediate change in the pressure applied to said resistance, said engaging means permitting one of said coils to vary said resistance independently of the other coil and its operating means.

3. An electrical regulator comprising a series solenoid and a shunt solenoid, plungers therefor, mechanical connections between said plungers, said mechanical connections including a clutch, and a regulating resistance adapted to be controlled by one or both of said solenoids.

4. An electric regulator comprising a compressible resistance, a bell crank lever and a spring coöperating therewith to normally compress said resistance, a series solenoid and a shunt solenoid each having a plunger, each of said selenoids being adapted when energized to move said bell crank lever so as to decrease said pressure, and mechanical connections between said plungers whereby the movement of one plunger is communicated to the other plunger, said mechanical connections including a clutch.

5. An electric regulator comprising a compressible resistance, a bell crank lever and a spring coöperating therewith to normally compress said resistance, a series solenoid and a shunt solenoid each having a plunger, each of said solenoids being adapted when energized to move said bell crank lever so as to decrease said pressure, mechanical connections between said plungers whereby the movement of one plunger is communicated to the other plunger, said mechanical connections including a clutch, and means for rendering said clutch inoperative when said shunt solenoid is deënergized.

6. In combination, a generator having a shunt field winding, a variable resistance connected in the generator shunt field circuit, a series solenoid connected in the external circuit, a shunt solenoid connected across the generator terminals, a plunger for each of said solenoids, and mechanical connections between said plungers and said variable resistance, whereby either solenoid may vary said resistance, said mechanical connections including a clutch for causing concerted action between said plungers at certain times, while permitting independent action of one of said plungers at other times.

7. In a car lighting system, a variable speed generator, a shunt field circuit therefor, an external circuit and a storage battery connected across the same, a series coil connected in said external circuit and a shunt coil connected across the generator terminals, a variable resistance connected in the generator field circuit, and mechanical connections between each of said coils and said resistance, whereby said series coil is adapted to confine the generator current within a predetermined limit during the normal charging period of the battery, and whereby said shunt coil responds to a predetermined increase in generator voltage due to the counter-electromotive force of the battery and increases said resistance to cut down the generator current and prevent overcharging of the battery, said mechanical connections including a clutch.

8. In an electric regulator, current responsive operating means, voltage responsive operating means, a variable resistance, and means whereby said current responsive operating means may operate on said resistance independently of said voltage responsive operating means and whereby said voltage controlled operating means may be instantly operative through said current responsive operating means regardless of the relative positions of said operating means.

9. The combination with a generator of a regulating element affecting the operation thereof, lever mechanism for affecting said element, current responsive means connected with said lever mechanism, clutch mechanism adapted to engage said lever mechanism at a point of greater leverage than the current responsive means and voltage responsive means coöperating with said clutch mechanism to affect the operation of the generator.

In witness whereof, I have hereunto subscribed my name in the presence of two witnesses.

WILLIAM A. TURBAYNE.

Witnesses:
F. G. SWANNIE,
GEO. B. JONES.